Jan. 1, 1963 W. T. RENTSCHLER 3,071,053
PHOTOGRAPHIC CAMERA WITH AUTOMATIC EXPOSURE ADJUSTMENT
Filed July 26, 1960 2 Sheets-Sheet 1

INVENTOR
WALDEMAR T. RENTSCHLER
BY *Ernest C. Montague*
ATTORNEY.

United States Patent Office 3,071,053
Patented Jan. 1, 1963

3,071,053
PHOTOGRAPHIC CAMERA WITH AUTOMATIC EXPOSURE ADJUSTMENT
Waldemar T. Rentschler, Calmbach (Enz), Germany, assignor to Fa. Alfred Gauthier G.m.b.H., Calmbach (Enz), Germany, a corporation of Germany
Filed July 26, 1960, Ser. No. 45,414
Claims priority, application Germany Aug. 22, 1959
1 Claim. (Cl. 95—10)

The present invention relates to a photographic camera with automatic exposure adjustment, wherein at least one exposure factor is pre-set, while another exposure factor is automatically adjustable in response to an exposure regulator depending upon the pre-setting.

It is known in connection with photographic cameras of this type to consider one or a plurality of exposure factors by turning the measuring instrument of the exposure meter, by disposing a diaphragm in front of the photocell, or by inserting a resistance into the circuit of the measuring instrument. In some of these devices, particularly in those mentioned first, it is, however, necessary to provide a setting change of the pre-settable exposure factors, yet only, if the adjustment device of the depending exposure factor is in a predetermined starting position, in order to avoid damages to the exposure meter or for additional other reasons.

It is, therefore, one object of the present invention to provide a photographic camera of the type set forth above with automatic exposure adjustment in a simple manner, wherein it is assured in a safe manner and without particular attention of the operator of the camera, that a setting change of the pre-settable exposure factors does not lead to disadvantageous or undesirable results for the exposure regulator.

The present invention brings about in cameras of the previously mentioned type, the advantage, that an adjustment change of the pre-settable exposure factors can be performed only in one single predetermined starting position of the adjustment device of the dependent exposure factor. No instructions of any kind are thus required for the person operating the camera, in order to avoid a disadvantageous influence upon the exposure regulator, so that the operation of the camera is extremely simple and safe.

It is yet another object of the present invention to provide a photographic camera with automatic exposure adjustment, wherein particularly, in case a plurality of factors are to be pre-set, a very favorable, simple and effort-saving realization of the present invention may be obtained in such manner, that the adjustment devices for the pre-settable exposure factors are releasably coupled together for a joint movement and that a single locking device only is provided, which cooperates with the adjustment device directly connected with the exposure regulator.

With these and other objects in view which will become apparent in the following detailed description, the present invention will be clearly understood in connection with the accompanying drawings, in which.

Figure 1:
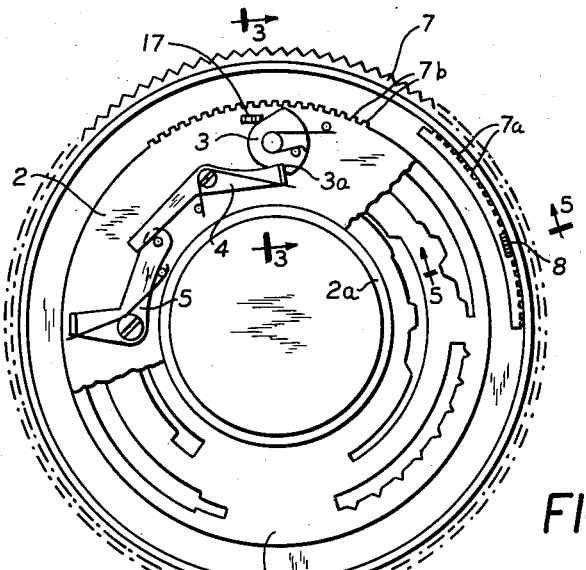
FIGURE 1 is a front elevation, partly in section, of a photographic lens shutter shown in tensioned position with a time adjustment ring, shown in part only, the unimportant parts of the shutter being not shown for the purpose of better demonstration.

Referring now to the drawings, and in particular to FIGS. 1 to 6, the housing 1 of a photographic lens shutter has disposed therein the base plate 2 (FIGS. 1 and 2) carrying, in known manner, the parts of the shutter mechanism. The base plate 2 has a tubular connection 2a, which is adapted to receive the lenses of the objective. A tensioning and driving disk 3 is mounted on the base plate 2, which can be set into tensioning position, in known manner, by means (not shown), either manually or by means of the film transport over a gear connection. A locking lever 4 prevents the release of the disk 3 from its tensioned position (FIG. 1). The release of the locking lever 4 takes place upon release of the shutter by means of a lever 5. A setting ring 7 for the film sensitivity carries slot-like recesses 7a (FIGS. 1, 2, 5 and 6), which setting ring 7 may be coupled with a setting ring 6 for the adjustment of the exposure time. The recesses 7a receive a spring 8 secured to the setting ring 6, the spring 8 having a gripping member 8a.

Figure 7:
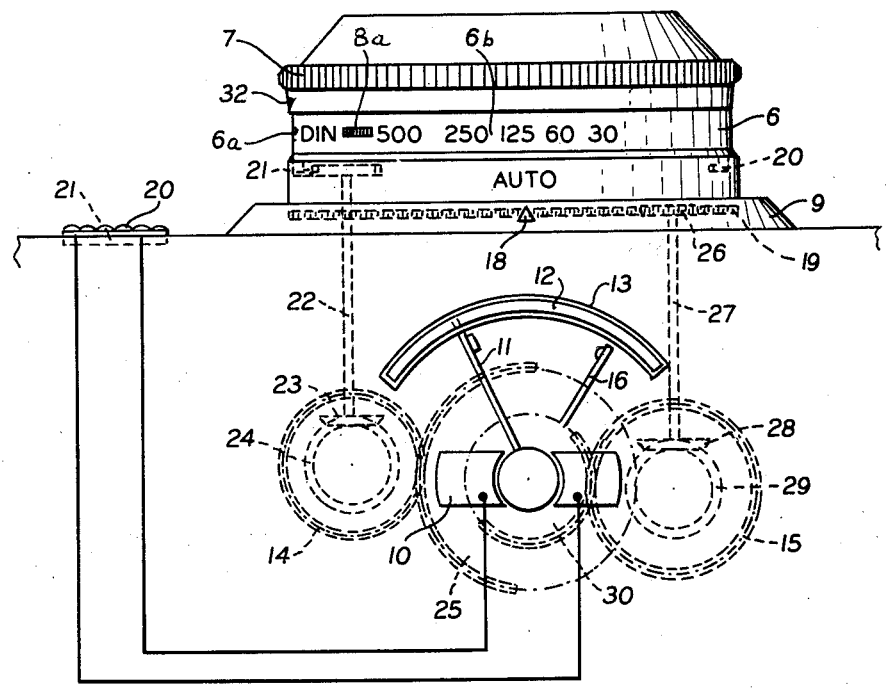
FIG. 7 is a schematic showing of the exposure regulator in combination with the adjusters for the pre-settable exposure factors, namely time and film sensitivity, and the adjustment device for the depending, automatically adjustable exposure factor, namely the diaphragm.

Referring now again to the drawings, and in particular to FIG. 7, the camera is shown schematically including the exposure regulator. A moving coil measuring instrument 10 is disposed in the camera housing indicated by an annular tube 9. If the camera is in its original position, namely, the "tension position," the pointer 11 of the moving coil measuring instrument 10 is freely movable. By means of a gear train disposed between the setting ring 7 for the film sensitivity and the setting ring 6 for the exposure time, respectively, on the one hand, and the moving coil measuring instrument 10, on the other hand, as shown schematically, upon turning or rotation of the latter, the pre-setting of the exposure time and of the film sensitivity can be brought about in known manner. A driving connection between the rings 6, 7 and the moving coil measuring system 10 is accomplished by means of a toothed ring 20 which is fixedly secured to the film sensitivity ring 7 by any suitable means (not shown). The rotation of the ring 20 is transmitted by means of a pinion 21, a shaft 22, bevelled gears 23, 24 and a gear 14 to a base plate 25 carrying the moving coil measuring system 10. By means of a further, likewise known, and, for this reason, merely schematically indicated, gear train, the known diaphragm mechanism denoted merely by a drive wheel 19 of the diaphragm is connected with a sensing pointer 16 disposed coaxially with the pointer 11 of the moving coil measuring instrument 10. The gear train includes a pinion 26 meshing with the drive wheel 19, a shaft 27, bevel gears 28, 29 and a pinion 15, which are in engagement with a pinion 30 of the sensing pointer 16. The gear train being under the effect of a drive spring (not shown) for automatic setting of the diaphragm is released in response to the shutter release, in a manner described below.

In accordance with the present invention, a locking is now arranged, which locks the setting rings 6, 7 for the pre-settable factors, namely the exposure time and the film sensitivity, against movement, if the camera is not in its predetermined starting position, or normal resting which is in the illustrated embodiment the tensioned position of the camera.

In accordance with a further development of the present invention a single locking device only is arranged for the locking of the setting ring of the film sensitivity and of the setting ring for the adjustment of the exposure time, respectively, against a displacement which would damage the moving coil measuring instrument 10. The locking device is operatively connected with the setting ring 7 for the film sensitivity, as set forth below.

Figure 3:
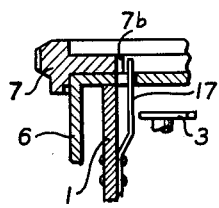
FIG. 3 is a section along the lines 3—3 of FIG. 1.
Figure 5:
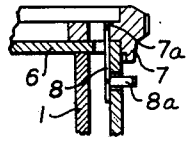
FIG. 5 is a section along the lines 5—5 of FIG. 1, indicating a coupling means for the adjustment rings for the pre-settable factors, namely the film sensitivity and exposure time.
Figure 4:
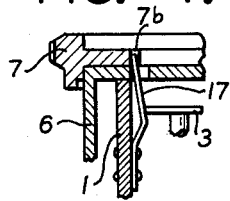
FIG. 4 is a section along the lines 4—4 of FIG. 2.
Figure 2:
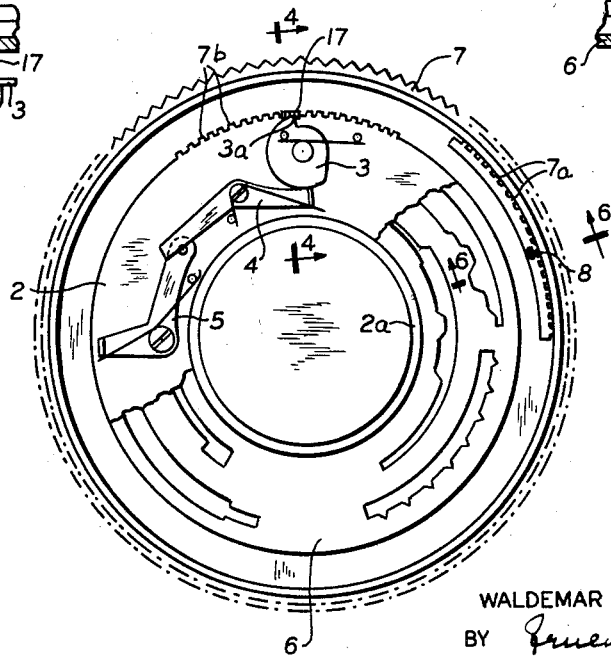
FIG. 2 is a front elevation of the photographic lens shutter, as shown in FIG. 1, however, in released position.

The locking device comprises a locking spring 17 which is riveted to the housing 1 (FIGS. 3 and 4). The locking spring 17 is controlled by the nose projection 3a of the tensioning and driving disk 3 in such a manner that at the end of the movement of the tensioning disk 3, the locking spring 17 is pressed into the recesses 7b of the setting ring 7 for the film sensitivity.

By this arrangement, it is assured that the moving coil measuring instrument 10 cannot be damaged in any setting position of the camera, since, on the one hand, the pointer 11 of the moving coil measuring instrument 10 is not clamped in the tensioned position of the camera, and on the other hand, upon release of the camera no rotation of the moving coil measuring instrument 10 can take place by means of the setting ring 7 for the film sensitivity or that for the exposure time.

A particular advantage of this locking arrangement, designed as described above, resides in the fact that for its structure and arrangement a minimum of space and of structure parts are required.

The operation and function of the camera, described in the given embodiment, is as follows:

It is assumed that the shutter is in tensioned position, that is, that the tensioning disk 3 is brought, in known manner, manually or by means of the film transport into the position shown in FIG. 1. In this position the settings for the film sensitivity and exposure time can take place.

Figure 6:
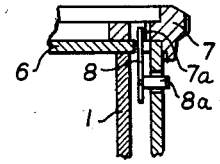
FIG. 6 is a section along the lines 6—6 of FIG. 2, showing the adjustment rings in non-coupled position.

For the setting of the film sensitivity, the coupling between the setting ring 7 for the film sensitivity and the setting ring 6 for the adjustment of the exposure time must be released by pressing down the spring 8 by means of the gripping member 8a (FIGS. 6 and 7). Upon rotation of the ring 7, the sensitivity corresponding to a particular film is set on the sensitivity scale 6a of the setting ring 6 for setting the exposure time, whereby the scale 6a cooperates with an index mark 32, arranged on the setting ring 7. Then, upon release of the spring 8, the setting ring 7 for setting the film sensitivity is coupled again with the setting ring 6 for setting the exposure time. For the preselection of a predetermined exposure time the coupled setting rings 6 and 7 are turned until the corresponding value of a time scale 6b is disposed opposite an immovable marker 18.

During the adjustment or setting of the rings 6 and 7, the moving coil measuring instrument 10 is likewise rotated over the gear train 14 and 21-25. The pre-setting is thereby terminated and the position of the pointer 11 of the moving coil instrument 10 is now determined exclusively by the intensity of the light to which a photocell 21a is exposed, the photocell 21a being disposed on the front wall of the camera behind a honeycomb window 20a and connected, in known manner, with the moving coil measuring instrument 10.

Upon operation of the release of the camera (not shown), at first the instrument pointer 11 is clamped securely by the clamping device 12, 13. As can be ascertained from FIG. 7 of the drawings, the clamping device for the instrument pointer 11, which is not part of the present invention and known in the prior art as in Patent No. 2,868,095 to Gebele, dated January 13, 1959, comprises the two parts 12 and 13. The part 13 is formed as an immovable engagement face for the instrument pointer, while the part 12 is connected with the release member (not shown) for the camera and removable in response to the movement of the release member. In the inoperative position of the release member, the part 12 of the clamping device is lifted from the instrument pointer 11, so that the latter can move freely. If, however, the release member is operated, the part 12 engages the instrument pointer 11, for instance by means of a spring (not shown) and presses the latter towards the immovable engagement face of the part 13. This process is terminated prior to abutment of the sensing pointer 16 on the instrument pointer 11. Then, the gear train 15, 19 and 26 to 30, which is under the effect of a previously tensioned spring is released, whereby the diaphragm is adjusted by means of the gear train to a point until the sensing pointer 16 abuts the securely clamped pointer 11 of the moving coil measuring instrument 10. The diaphragm is correctly automatically set in the thus reached position in dependency upon the exposure time, film sensitivity and intensity of light. The particular structure is known in the art, as disclosed in Patent No. 2,868,095 to Gebele, dated January 13, 1959. It has been stated above that the gear train 15, 19 and 26 to 30 being under the effect of a drive spring (not shown) for automatic setting of the diaphragm is released in response to the shutter release. Any suitable tensioning device as in known manner, the film transport of the camera is used for tensioning the drive spring, which tensioning device is operatively connected with the gear train, as well as with the tensioning and driving disc by means of a gear connection as stated before. FIG. 7 discloses the position of the gear train and of the sensing pointer 16 coordinated to the tensioned position of the drive spring and the diaphragm is adjusted to the greatest or the smallest opening in such position. A locking device (not shown), connected with the releasing device of the camera serves the purpose to retain the entire arrangement in this position.

Upon operation of the releasing device, at first the clamping device becomes effective in the manner described above and secures the instrument pointer 11 in its position responsive to the brightness of the scene, the set exposure time and the film sensitivity. Upon further pressing of the releasing device, the locking means for the gear train 15, 19 and 26 to 30 are released. The latter starts then its movement by a drive spring and simultaneous closing and opening, respectively, of the diaphragm takes place to a point when the sensing pointer 16 abuts the secured instrument pointer 11 and, thereby, stops the setting movement of the device.

Such driving devices are known in the art and are not part of the present invention. Such device is disclosed likewise in the mentioned Patent No. 2,868,095 to Gebele, dated January 13, 1959.

Finally, in the end phase of the camera release, after the diaphragm has been set, the driving disk 3 is released by means of the levers 4 and 5, so that now the opening and closing movements of the known shutter blades (not shown) take place in accordance with the set exposure time.

At the end of the movement of the driving disk 3, the nose extension 3a of the latter engages the locking spring 17 and pushes the latter into the recesses 7b of the setting ring 7 for the film sensitivity, so that the latter is locked.

Only upon tensioning of the shutter, which is preferably coupled with the film transport, the locking of the setting ring 7 for the film sensitivity is released. Since, however, simultaneously with the tensioning, the diaphragm, the gear train 15, 19 and 26 to 30 and the sensing pointer 16 return to their original starting positions and at this point the clamping device 12, 13 releases the pointer 11 of the moving coil measuring instrument 10, the setting of the sensitivity and the exposure time can now take place without any damage to the moving coil measuring instrument 10 and to its pointer, respectively.

While I have disclosed one embodiment of the present invention, it is to be understood that this embodiment is given by example only and not in a limiting sense, the scope of the present invention being determined by the objects and the claim.

I claim:

A photographic camera having an automatic exposure adjustment, comprising
a lens housing,
a base plate disposed in the forward portion of said housing,
a shutter mechanism carried by said base plate,
a shutter setting ring mounted on said housing and manually settable in dependency upon the exposure time,
a diaphragm,
an exposure control device comprising a galvanometer having a pointer set by a photo-electric cell,
said exposure control device being disposed in said housing and automatically setting said diaphragm in response to the position of said pointer, means clamping said pointer while the shutter mechanism is in released condition, means varying the position of said galvanometer in response to movement of said setting ring, and
a locking means retaining said setting ring in the released position of said shutter mechanism and releasing said setting ring in the tensioned position of said shutter mechanism, in order to avoid damage to said exposure control device in the released position of said shutter mechanism.

References Cited in the file of this patent

UNITED STATES PATENTS

| | | |
|---|---|---|
| 2,868,095 | Gebele | Jan. 13, 1959 |
| 2,913,969 | Faulhaber | Nov. 24, 1959 |
| 2,923,216 | Greger | Feb. 2, 1960 |
| 2,925,760 | Broschke | Feb. 23, 1960 |